US012657961B2

(12) United States Patent
Sammoura et al.

(10) Patent No.: US 12,657,961 B2
(45) Date of Patent: Jun. 16, 2026

(54) FINGERPRINT ENROLLMENT USING COLLOCATION OF A USER'S TOUCH AND A FINGERPRINT SENSOR

(71) Applicant: Google LLC, Mountain View, CA (US)

(72) Inventors: Firas Sammoura, Dublin, CA (US); Jean-Marie Bussat, San Jose, CA (US)

(73) Assignee: Google LLC, Mountain View, CA (US)

( * ) Notice: Subject to any disclaimer, the term of this patent is extended or adjusted under 35 U.S.C. 154(b) by 291 days.

(21) Appl. No.: 18/250,464

(22) PCT Filed: Apr. 26, 2021

(86) PCT No.: PCT/US2021/029153
§ 371 (c)(1),
(2) Date: Apr. 25, 2023

(87) PCT Pub. No.: WO2022/093312
PCT Pub. Date: May 5, 2022

(65) Prior Publication Data
US 2023/0419739 A1     Dec. 28, 2023

Related U.S. Application Data

(60) Provisional application No. 63/108,113, filed on Oct. 30, 2020.

(51) Int. Cl.
*G06V 40/60* (2022.01)
*G06V 40/12* (2022.01)
(Continued)

(52) U.S. Cl.
CPC .......... *G06V 40/67* (2022.01); *G06V 40/1318* (2022.01); *G06V 40/1335* (2022.01); *G06V 40/1353* (2022.01); *G06V 40/50* (2022.01)

(58) Field of Classification Search
CPC ......... G06V 40/12–1394; G06V 40/50; G06V 40/60–67
See application file for complete search history.

(56) References Cited

U.S. PATENT DOCUMENTS 9,098,756 B2     8/2015 Endoh
9,898,642 B2     2/2018 Han et al.
(Continued)

FOREIGN PATENT DOCUMENTS

CN     105981043 A     9/2016
CN     106485190 A     3/2017
(Continued)

OTHER PUBLICATIONS

"International Preliminary Report on Patentability", Application No. PCT/US2021/029153, May 2, 2023, 7 pages.
(Continued)

*Primary Examiner* — Roberto W Flores
(74) *Attorney, Agent, or Firm* — Colby Nipper PLLC

(57) ABSTRACT

This disclosure describes apparatuses, methods, and techniques for enabling a user to safeguard a computing device with a fingerprint identification system by using biometric data. The fingerprint identification system includes a fingerprint sensor used during an enrollment process of the user's biometric data. The biometric data may include fingerprint data from the user's thumb, finger, a plurality of fingers, palm, and so forth. The computing device uses a collocation of a user's touch, for example, a thumb-tap, and a fingerprint sensor's location to guide the user to complete the enrollment process of a full fingerprint with ease and with fewer thumb-taps. Consequently, the techniques enable biometric security with an enrollment process having a good user experience.

20 Claims, 10 Drawing Sheets

(51) Int. Cl.
G06V 40/13 (2022.01)
G06V 40/50 (2022.01)

(56) References Cited

U.S. PATENT DOCUMENTS

| | | | | |
|---|---|---|---|---|
| 2005/0084155 A1* | 4/2005 | Yumoto | ............. | G06V 40/1365 |
| | | | | 382/218 |
| 2006/0093192 A1 | 5/2006 | Bechtel | | |
| 2014/0341446 A1 | 11/2014 | Hare et al. | | |
| 2015/0086090 A1 | 3/2015 | Jung et al. | | |
| 2015/0131876 A1* | 5/2015 | Chang | ................... | G06F 3/0488 |
| | | | | 382/124 |
| 2015/0242696 A1* | 8/2015 | Kim | ........................ | G06V 40/67 |
| | | | | 345/173 |
| 2016/0132711 A1* | 5/2016 | Setterberg | ............. | G06T 3/4038 |
| | | | | 382/124 |
| 2016/0217310 A1* | 7/2016 | Shah | ........................ | G06V 40/67 |
| 2016/0239701 A1* | 8/2016 | Lee | ................... | G06V 40/1335 |
| 2016/0314337 A1* | 10/2016 | Suh | ...................... | G06V 10/431 |
| 2017/0004642 A1* | 1/2017 | Bauchspies | ........ | G06V 40/1365 |
| 2017/0011540 A1* | 1/2017 | Bauchspies | ............. | G06T 11/60 |
| 2017/0039409 A1* | 2/2017 | Han | ...................... | G06F 3/0421 |
| 2018/0114047 A1* | 4/2018 | Kim | ........................ | G06F 21/32 |
| 2018/0150679 A1* | 5/2018 | Kim | ................... | G06V 40/1365 |
| 2018/0373917 A1 | 12/2018 | Sheik-Nainar et al. | | |
| 2020/0012844 A1* | 1/2020 | Kim | ...................... | G06V 10/25 |
| 2020/0097699 A1* | 3/2020 | Zeng | ...................... | H10K 50/86 |

FOREIGN PATENT DOCUMENTS

| | | |
|---|---|---|
| CN | 107977110 A | 5/2018 |
| EP | 3312752 | 4/2018 |
| WO | 2020105899 A1 | 5/2020 |
| WO | 2022093312 | 5/2022 |

OTHER PUBLICATIONS

"International Search Report and Written Opinion", PCT Application No. PCT/US2021/029153, Jul. 23, 2021, 10 pages.

Szent-Gyorgyi, "Fingerprint Recognition", Oct. 1985, pp. 76-256.

"Foreign Office Action", IN Application No. 202347028762, Apr. 19, 2024, 5 pages.

"Foreign Office Action", CN Application No. 202180073164.5, Nov. 15, 2025, 23 pages.

* cited by examiner 200-1

Smartphone
100-1

208

Display Screen
110

Display Message
210

Area 204

User Touch
202

UDFPS
Active Area 206

User-Touch
Centroid 218

User-Touch Map
212

Pixel With a
Touch Signal
214

Pixel Without a
Touch Signal
216

200-2

200-3

Smartphone
100-1

208

Display Screen
110

Display Message
210

Area 204

User Touch
202

UDFPS
Active Area 206

Pixel With a
Touch Signal
214-1

Pixel With a
Touch Signal
214-2

User-Touch
Heatmap
212-5

Pixel Without a
Touch Signal
216

300-1

300-2

400

Smartphone
100-1

208

Display Screen
110

Display Message
210

NxN Block 420

User Touch
402

User-Touch
Centroid 418

UDFPS
Active Area 406

User-Touch Map
412

Pixel With a
Touch Signal
414

Pixel Without a
Touch Signal
416

500

502-2

Left Loop 502

504-2

Right Loop 504

506-2

Whorl 506

502-1

504-1

506-1

Arch 508

Tented Arch 510

508-1

510-1

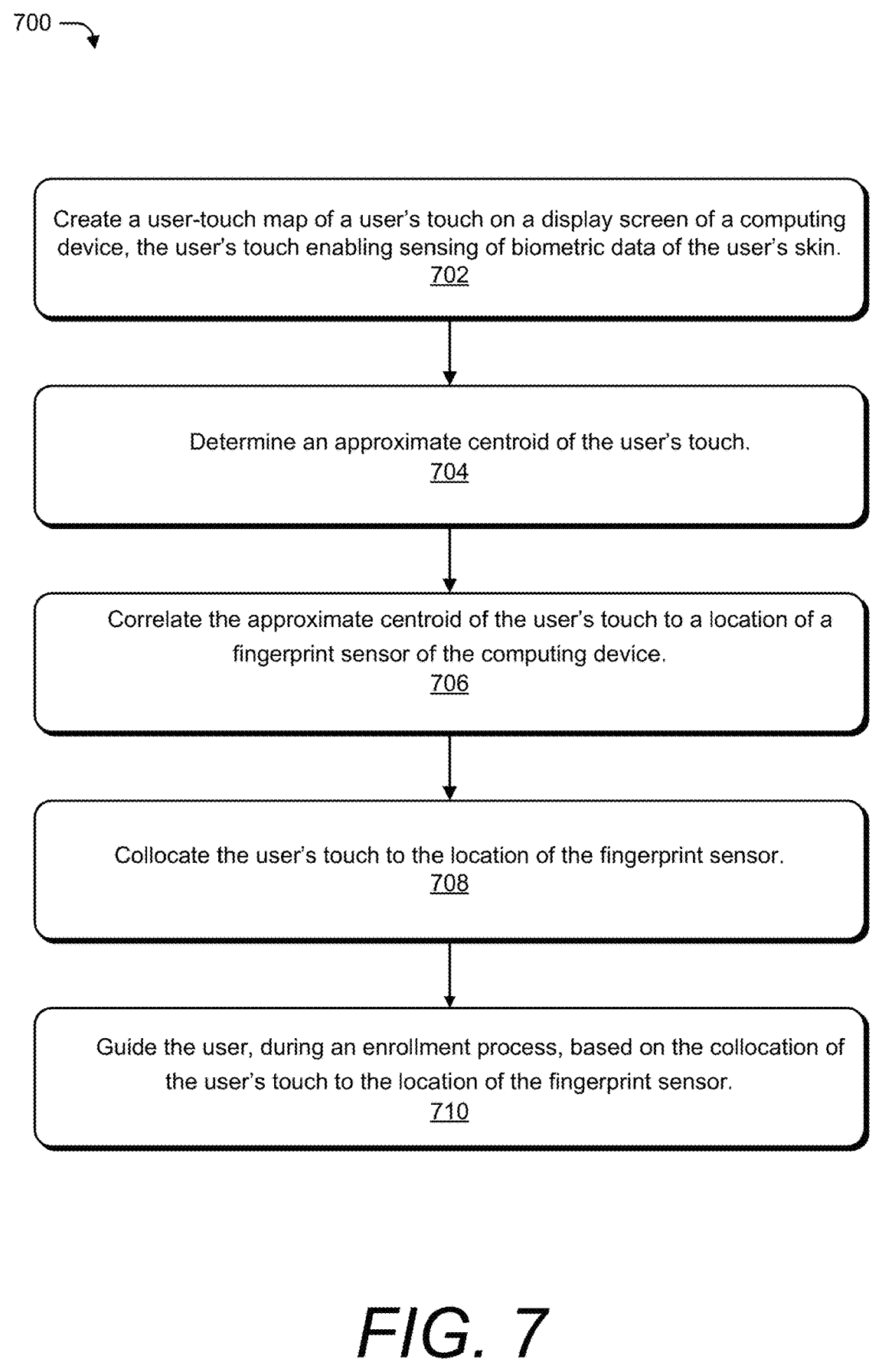

700 ⟍

Create a user-touch map of a user's touch on a display screen of a computing device, the user's touch enabling sensing of biometric data of the user's skin.
702

↓

Determine an approximate centroid of the user's touch.
704

↓

Correlate the approximate centroid of the user's touch to a location of a fingerprint sensor of the computing device.
706

↓

Collocate the user's touch to the location of the fingerprint sensor.
708

↓

Guide the user, during an enrollment process, based on the collocation of the user's touch to the location of the fingerprint sensor.
710

*FIG. 7*

FINGERPRINT ENROLLMENT USING COLLOCATION OF A USER'S TOUCH AND A FINGERPRINT SENSOR

RELATED APPLICATION(S)

This application is a national stage entry of International Application No. PCT/US2021/029153, filed Apr. 26, 2021, which claims the benefit of U.S. Provisional Application No. 63/108,113, filed Oct. 30, 2020, the disclosures of which are incorporated herein by reference in their entirety.

BACKGROUND

Computing devices (e.g., a smartphone) often include a fingerprint identification system. These fingerprint identification systems enable a user to safeguard their smartphone, application, function, or peripheral using biometric data (e.g., a fingerprint) of the user's finger, thumb, palm, and so forth. These fingerprint identification systems may include an under-display fingerprint sensor (UDFPS) embedded under the smartphone's display screen. During an enrollment process of the fingerprint, the smartphone may utilize the display screen to instruct the user to tap their thumb, finger, or palm on top of the UDFPS. The area of the user's thumb (e.g., thumb-pad) containing the biometric data may be eighteen millimeters by twenty-five millimeters, and the UDFPS may be six millimeters by six millimeters. In that case, the smartphone may instruct the user to tap their thumb six to thirty times on top of the UDFPS to capture a full image of the user's thumb. The smartphone may also instruct the user to tap their thumb on various locations on top of the UDFPS.

Many smartphones, however, may not correctly guide or instruct the user on how to tap their thumb to capture the full image of the user's thumb. The user may tap their thumb several times but still fail to present different portions of their thumb to the UDFPS. As a result, the smartphone may complete the enrollment process of the fingerprint without capturing the full image of the user's thumb, resulting in either poor biometric security (high false-acceptance rate) and/or improperly denying access to the user (high false-rejection rate). Therefore, it is desirable to have a technological solution that enables the user to complete the fingerprint's enrollment process with ease and fewer thumb-taps and for the smartphone to provide biometric security with an enrollment process having a good user experience.

SUMMARY

This disclosure describes apparatuses, methods, and techniques for enabling a user to safeguard a computing device with a fingerprint identification system by using biometric data. The fingerprint identification system includes a fingerprint sensor used during an enrollment process of the user's biometric data. The biometric data may include fingerprint data from the user's thumb, finger, a plurality of fingers, palm, and so forth. The computing device uses a collocation of a user's touch, for example, a thumb-tap, and a fingerprint sensor's location to guide the user to complete the enrollment process of a full fingerprint with ease and with fewer thumb-taps. Consequently, the techniques enable biometric security with an enrollment process having a good user experience.

In one aspect, a computer-implemented method creates a user-touch map of a user's touch on a display screen of a computing device, the user's touch enabling sensing of biometric data of the user's skin. The computer-implemented method then determines an approximate centroid of the user's touch, wherein the approximate centroid is an arithmetic mean location of the user's touch. The computer-implemented method correlates the approximate centroid of the user's touch to a location of at least one fingerprint sensor of the computing device. Responsive to the correlation of the centroid of the user's touch to the location of a fingerprint sensor, the computer-implemented method collocates the user's touch to the location of the at least one fingerprint sensor. The collocation of the user's touch to the location of the fingerprint sensor enables the computer-implemented method to guide the user during an enrollment process of the biometric data.

In another aspect, a computing device includes at least one fingerprint sensor, at least one display screen, at least one processor, and at least one computer-readable medium. The computer-readable medium can execute instructions (e.g., code) using the at least one processor. The instructions are configured to create a user-touch map of a user's touch on the at least one display screen, wherein the user's touch enables a sensing of biometric data of the user's skin. The instructions are also configured to determine an approximate centroid of the user's touch, wherein the approximate centroid is an arithmetic mean location of the user's touch. Further, the instructions may, optionally, also be configured to correlate the centroid of the user's touch to the location of the at least one fingerprint sensor. Correlating the centroid of the user's touch to the location of the at least one fingerprint sensor enables the computing device to collocate the user's touch to the location of the at least one fingerprint sensor. Finally, the computing device may optionally guide the user, during an enrollment process of the biometric data.

The disclosure describes examples where a computing device (e.g., user device, smartphone) analyzes information (e.g., fingerprint images) associated with a user or the computing device. The computing device uses the user's information after the computing device receives explicit permission from the user to collect, store, or analyze the information. For example, in situations discussed below in which a computing device authenticates a user based on fingerprints, the user will be provided with an opportunity to control whether programs or features of the computing device or a remote system can collect and make use of the fingerprint for a current or subsequent authentication procedure. Individual users, therefore, have control over what the computing device can or cannot do with fingerprint images and other information associated with the user. Information associated with the user (e.g., an enrolled image), if ever stored, is pre-treated in one or more ways so that personally identifiable information is removed before being transferred, stored, or otherwise used. For example, before the computing device stores an enrolled image (also referred to as an "enrolled template"), the computing device may encrypt the enrolled image. Pre-treating the data this way ensures the information cannot be traced back to the user, thereby removing any personally identifiable information that may otherwise be inferable from the enrolled image. Thus, the user has control over whether information about the user is collected and, if collected, how the computing device may use such information.

This summary introduces simplified concepts for capturing an enrolled image of a fingerprint, further described in the Detailed Description and Drawings. For ease of description and the sake of clarity, the disclosure focuses on capturing the enrolled image using a smartphone with an under-display fingerprint sensor (UDFPS) embedded under a display screen of the smartphone. The techniques, however, are not limited to the use of the UDFPS to capture the enrolled image. These techniques may be used with any fingerprint identification system that can infer a collocation between a user's touch and a fingerprint sensor. Also, the techniques are not limited to fingerprint data of the user's thumb; the techniques also apply to other forms of biometric data, including biometric data derived from the user's finger, a plurality of fingers, palm, and so forth. It is to be understood that the term "fingerprint data" may be used to refer to biometric data derived from the user's thumb, finger, a plurality of fingers, palm, and so forth, and is not limited to only data derived from a finger. Similarly, the term "thumb-tap" is not limited to a touch of a user's thumb, and may be used to refer to a touch on a display screen of a user's thumb, one of more of the user's fingers, and/or the user's palm. This summary is not intended to identify essential features of the claimed subject matter, nor is it intended for use in determining the scope of the claimed subject matter.

BRIEF DESCRIPTION OF THE DRAWINGS

The details of one or more aspects of a computing device with a fingerprint identification system that utilizes an enrolled template are disclosed. The same numbers are used throughout the drawings to reference like features and components.

FIG. 2-1 illustrates an example environment where the computing device is a smartphone; the smartphone uses collocation of a user's touch and the at least one fingerprint sensor during an enrollment process of the biometric data.

FIG. 2-2 illustrates an example environment of the smartphone guiding the user during the enrollment process of the biometric data by utilizing the collocation of the user's touch and the at least one fingerprint sensor.

FIG. 2-3 illustrates an example environment of the smartphone utilizing a user-touch heatmap of a display screen during the enrollment process of the biometric data.

FIG. 3-1 illustrates an example environment of the smartphone utilizing a visual touch-instruction during the enrollment process of the biometric data.

FIG. 3-2 illustrates an example environment of the smartphone utilizing a visual touch-duplicate and the visual touch-instruction during the enrollment process of the biometric data.

FIG. 7 illustrates a computer-implemented method that enables the user to complete the enrollment process of the biometric data.

DETAILED DESCRIPTION

Overview

Figure 1:
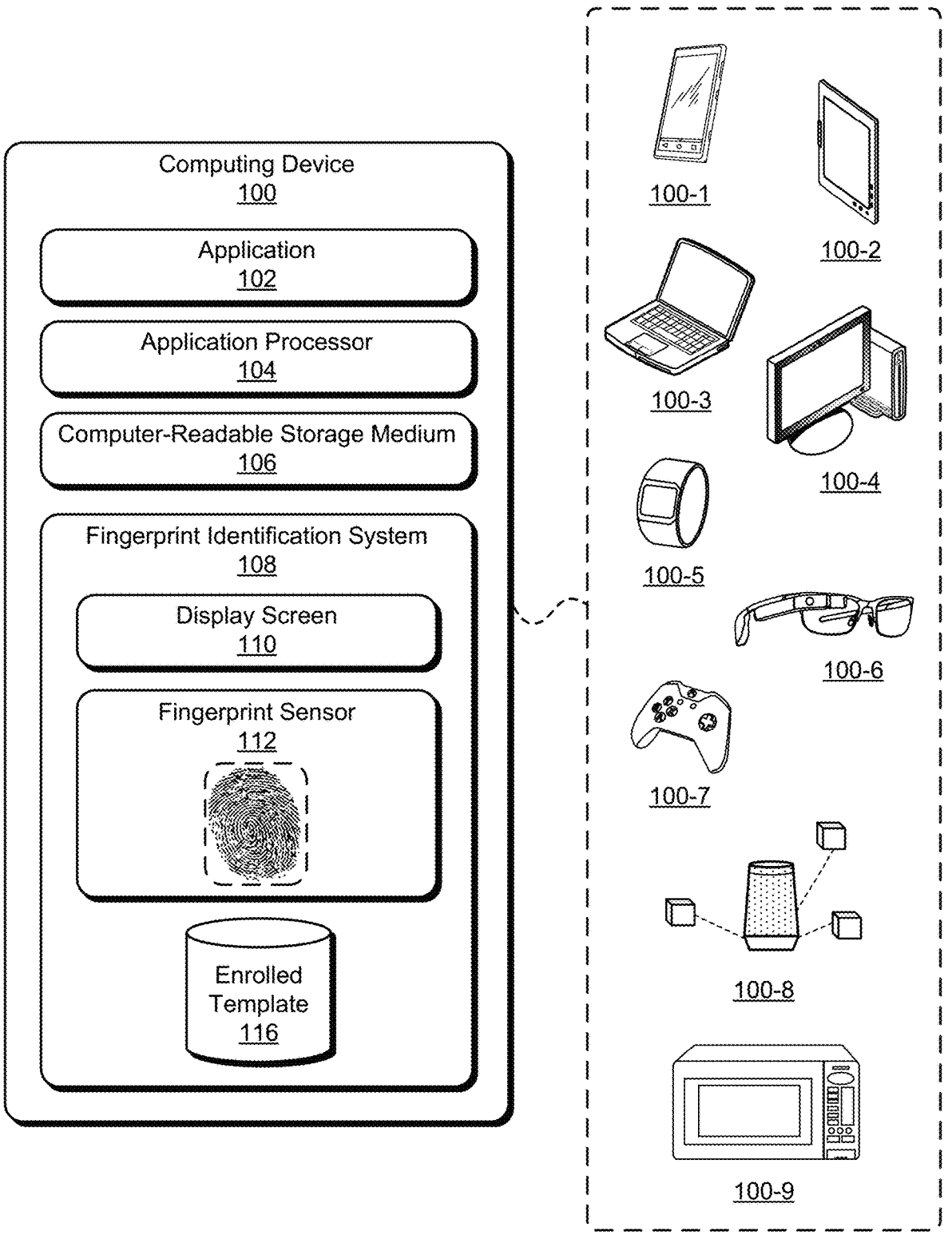
FIG. 1 illustrates an example computing device with a fingerprint identification system having at least one fingerprint sensor to authenticate a user utilizing an enrolled image containing biometric data.

This document describes apparatuses, methods, and techniques for a fingerprint identification system of a computing device (e.g., smartphone), which enables a user to capture an enrolled image of a fingerprint during an enrollment process. During the enrollment process, the smartphone may utilize a display screen to instruct the user to tap their thumb, finger, or palm several times on top of a fingerprint sensor (e.g., an under-display fingerprint sensor, UDFPS) to capture a full image of the thumb. Current smartphones, however, are not configured to decipher which portion of the thumb has been captured and which portion of the thumb still needs to be captured during the enrollment process, because the current smartphones may not correlate a location of a user's touch on the display screen in relation to a location of the UDFPS that is embedded under the display screen. As a result, the current smartphones may only capture an enrolled image of a partial fingerprint, resulting in deficient biometric security and/or a poor user experience.

In contrast, computing device (e.g., smartphone) described herein uses a collocation of the user's touch on the display screen and/or the UDFPS, keeping track of the portion of the thumb being captured by the UDFPS. In one aspect, the smartphone keeps track of a centroid of the user's touch. By doing so, as the user presents a portion of their thumb to the UDFPS in a first thumb-tap, the smartphone may display detailed instructions to the user before a next thumb-tap. The smartphone may display messages, such as "tap to the right," "tap to the left," "tap upward," "tap downward," and so forth. For example, the smartphone may display the message "tap to the right" when the centroid of the user's touch is located to the left of the UDFPS, "tap to the left" when the centroid of the user's touch is located to the right of the UDFPS, "tap upward" when the centroid of the user's touch is located downward of the UDFPS, and "tap downward" when the centroid of the user's touch is located upward of the UDFPS. Consequently, the user can complete the enrollment process with ease and with fewer thumb-taps, enabling the smartphone to provide biometric security with an enrollment process having a good user experience.

Throughout this disclosure, a "verify image" is a fingerprint image used for authentication during a verification process of the fingerprint (verification process). On the other hand, an "enrolled image" is an image that the smartphone captures during the enrollment process, for example, when the user first sets up the smartphone or an application. An enrolled image could also be updated during the verification process as the user uses the smartphone. Also, as described herein, an "enrolled template" can be a mathematical representation of the enrolled image. The enrolled template can be a vectorized representation of the enrolled image, which may take less memory space on the computing device. While beneficial in some respects, the use of a vectorized representation for an enrolled template is not required during the enrollment process or during the verification process. The described apparatuses, methods, and techniques can perform image-to-image (rather than vector-to-vector) comparisons, as well as other representations, to compare images of the enrolled image or the enrolled template.

While features and concepts of the described apparatuses, methods, and techniques for fingerprint identification systems of computing devices can be implemented in any number of different environments, systems, devices, and/or various configurations, aspects that enable the fingerprint identification system with one or more fingerprint sensors to capture a fingerprint (e.g., an enrolled image) are described in the context of the following example devices, systems, methods, and/or configurations.

Example Environments

FIG. 1 illustrates an example computing device 100 with a fingerprint identification system 108 having at least one fingerprint sensor 112, which is used to authenticate a user utilizing an enrolled template 116 of a user's thumb, fingertip, or plurality of fingertips. The computing device 100 may include additional or fewer components than what is illustrated in FIG. 1. FIG. 1 illustrates the computing device 100 as being a variety of example computing devices, including a smartphone 100-1, a tablet 100-2, a laptop 100-3, a desktop computer 100-4, a computing watch 100-5, computing eyeglasses 100-6, a gaming system or controller 100-7, a smart speaker system 100-8, and an appliance 100-9. The computing device 100 can also include other devices, for example, televisions, entertainment systems, automobiles, unmanned vehicles (in-air, on the ground, or submersible "drones"), trackpads, drawing pads, netbooks, e-readers, home security systems, doorbells, and other devices with a fingerprint identification system.

The computing device 100 includes at least one application processor 104 and at least one computer-readable storage medium (CRM 106). The application processor 104 may include any combination of one or more controllers, microcontrollers, processors, microprocessors, hardware processors, hardware processing units, digital signal processors, graphics processors, graphics processing units, and the like. The application processor 104 processes computer-executable instructions (e.g., code) stored by the CRM 106. The CRM 106 may include any suitable memory media and storage media, for example, volatile memory (e.g., random-access memory (RAM)), non-volatile memory (e.g., Flash memory), optical media, magnetic media (e.g., disk or tape), and so forth. Also, the CRM 106 may store instructions, data (e.g., biometric data), and/or other information, and the CRM 106 excludes propagating signals.

The computing device 100 may also include an application 102. The application 102 may be a software, applet, peripheral, or other entity that requires or favors authentication of a user. For example, the application 102 can be a secured component of the computing device 100 or an access entity to secure information accessible from the computing device 100. The application 102 can be an online banking application software or webpage that requires fingerprint authentication before logging in to an account. Further, the application 102 may be part of an operating system (OS) that prevents access (generally) to the computing device 100 until the user's fingerprint is authenticated. The user may execute the application 102 partially or wholly on the computing device 100 or in "the cloud" (e.g., on a remote device accessed through the Internet). For example, the application 102 may provide an interface to an online account using an internet browser and/or an application programming interface (API).

The fingerprint sensor 112 may be an under-display fingerprint sensor 112-1 (UDFPS 112-1) embedded under a display screen 110, a side fingerprint sensor 112-2 embedded on a side of the computing device 100 (e.g., smartphone 100-1), and so forth.

The display screen 110 may display graphical images and/or instructions provided by the computing device 100 and may aid the user in interacting with the computing device 100. The display screen 110 may be a touch-sensitive display, commonly known as a touchscreen. The display screen 110 may comprise a plurality of pixels, wherein each pixel is configured to generate an output (referred to herein as a touch signal) when a user touches the display screen. The pixels may be arranged in an array, such as a square or rectangular array along two orthogonal axes in a plane parallel to the plane of the display screen, and each pixel may have a respective coordinate position (e.g., a x-y coordinate pair) in the array. Since the area of a user's touch (e.g., the area of the user's fingertip, thumb or palm) will typically be greater than the area of a single pixel of the display screen 110, the user's touch will cause multiple pixels each to generate a respective touch signal. Thus, the display screen 110 may be configured to create or generate an output (referred to herein as a user-touch map) indicative of which pixels have generated a touch signal. For example, the user-touch map may be an array with multiple elements, each element corresponding to a respective pixel of the display screen, where each element has a value (e.g., a binary value) indicative whether the corresponding pixel of the display screen 110 has generated a touch signal in response to a user's touch. The display screen 110 can be separated from the fingerprint identification system 108 (not illustrated as such) or can be part of the fingerprint identification system 108 (as is illustrated in FIG. 1).

Enrollment Process

Figures 1, 2:
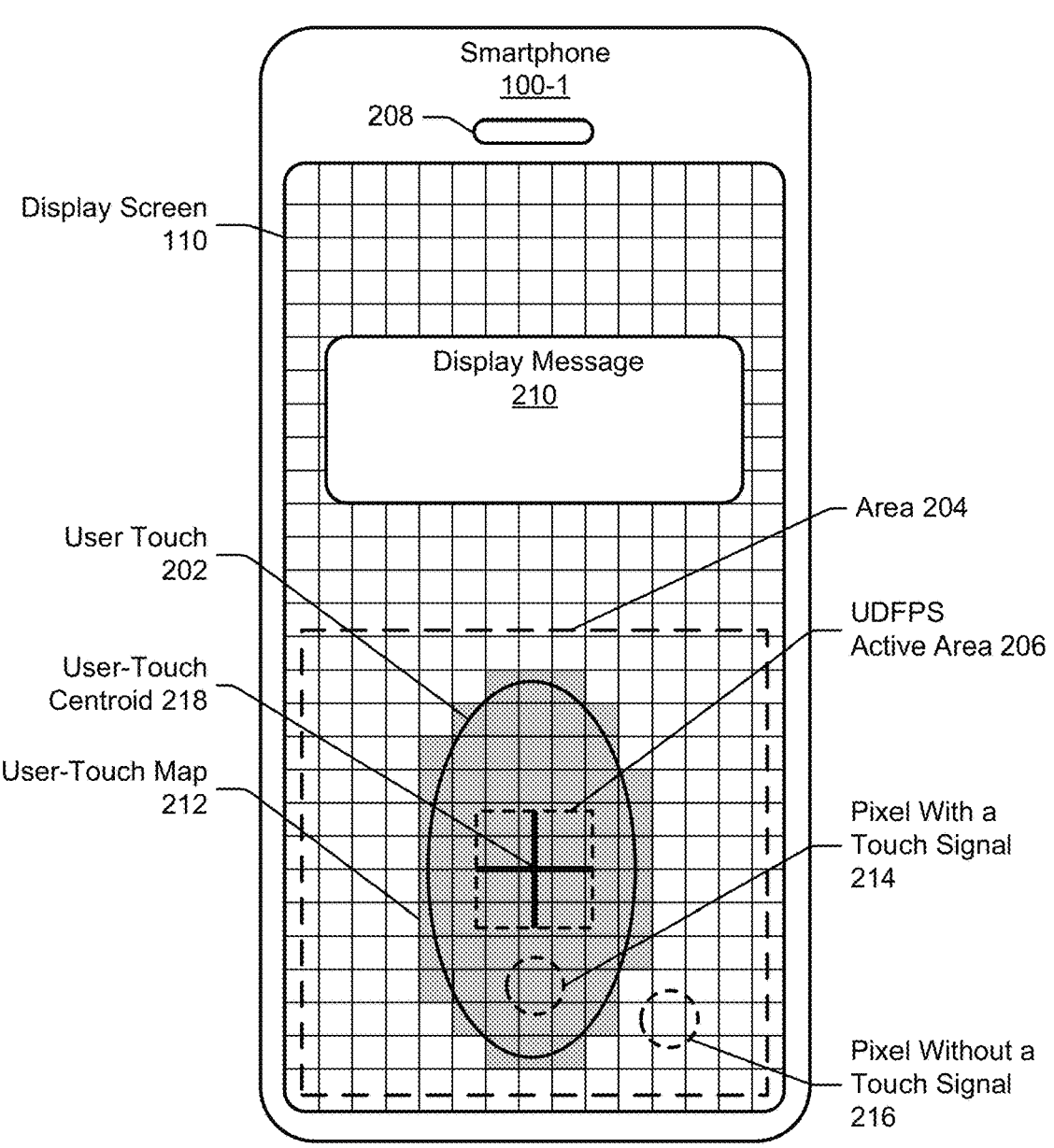
Figure 2:
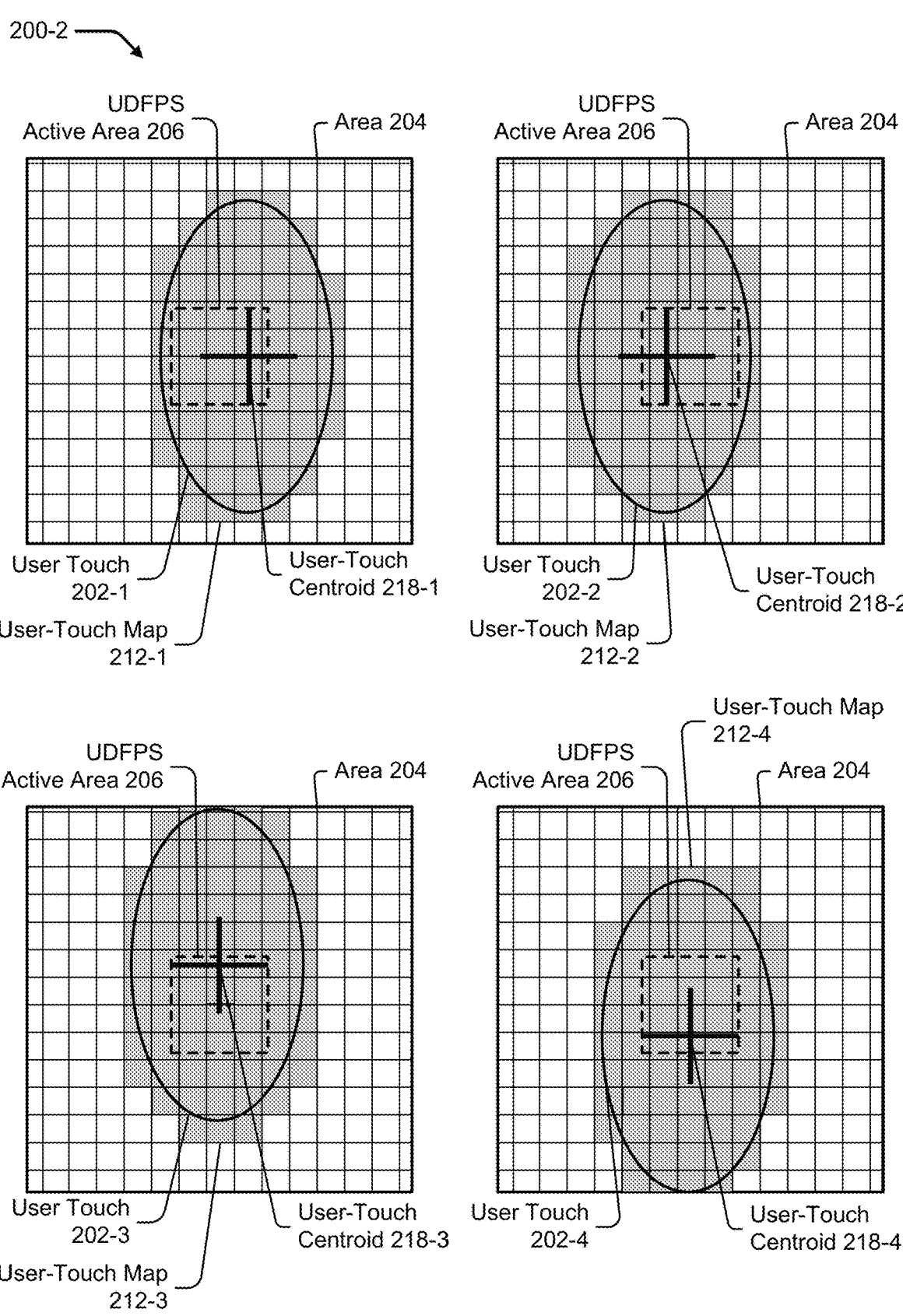

FIG. 2-1 illustrates an example environment 200-1 of the computing device 100 being a smartphone 100-1. Assume the smartphone 100-1 includes the UDFPS 112-1, which is embedded under the display screen 110. The display screen 110 can sense a user touch 202 as the user touches or presses the display screen 110 using their thumb, finger, or palm. During the enrollment process, as the user taps or presses their thumb on the display screen 110 inside an area 204, a UDFPS active area 206 of the UDFPS 112-1 can capture an enrolled image of the user touch 202. The UDFPS active area 206, however, may only capture a portion of the user touch 202 because the user touch 202 may be larger than the UDFPS active area 206, the user touch 202 may be off-center from the UDFPS active area 206, or any combination thereof. Thus, the captured enrolled image may be inadequate to create the enrolled template 116. Hence, the smartphone 100-1 may instruct the user to tap their thumb multiple times on top of the UDFPS active area 206. The user, however, cannot see or feel the UDFPS active area 206, and the user cannot determine whether they present the appropriate portion(s) of their thumb to the UDFPS active area 206. To this end, during the enrollment process, the smartphone 100-1 instructs the user on how to tap their thumb using a speaker 208, a display message 210, a peripheral of the smartphone 100-1 (e.g., wireless headphones), or a combination thereof.

To aid the user during the enrollment process, the smartphone 100-1 creates a user-touch map 212 of the user touch 202 by differentiating pixels with a touch signal 214 from pixels without a touch signal 216 on the display screen 110, as is illustrated in FIG. 2-1. It is to be understood that the illustration of FIG. 2-1 is not to scale, and that the pixels of the display screen 110 are smaller than illustrated in proportion to the display screen 110, the user touch 202, and the UDFPS active area 206. Consequently, the user-touch map 212 is approximately the same as the user touch 202. Based on the user-touch map 212, the smartphone 100-1 determines an approximate user-touch centroid 218. The user-touch centroid 218 is an arithmetic mean location of the user-touch map 212 and, subsequently, the user touch 202. For example, the user-touch centroid 218 may be the coordinate position of the center of the touch map 212 (in other words, the coordinate position of the arithmetic mean location of all the pixels with a touch signal 214 in the user-touch map 212).

The smartphone 100-1 then can correlate the user-touch centroid 218 to the UDFPS active area 206. For example, correlating the user-touch centroid 218 to the UDFPS active area 206 may include determining a difference between the user-touch centroid 218 and UDFPS active area 206 (and, in particular, the center of the UDFPS active area 206). For example, the user-touch centroid 218 may be correlated the UDFPS active area 206 by subtracting the coordinate position of the center of the touch map 212 from the coordinate position of the center of the UDFPS active area 206 (or vice versa). In response, the smartphone 100-1 can collocate the user touch 202 to the fingerprint sensor 112 (e.g., UDFPS 112-1, UDFPS active area 206). For example, collocating the user's touch 202 to the location of the fingerprint sensor 112 may include determining an angle and/or a distance of a geometric translation that causes the user-touch centroid 218 to coincide with the UDFPS active area 206. The geometric translation can be calculated using the difference between the coordinate position of the center of the user-touch map 212 and the coordinate position of the center of the UDFPS active area 206. Collocating the user touch 202 to the UDFPS active area 206 enables the smartphone to guide the user during the enrollment process, as is further described below.

FIG. 2-2 illustrates an example environment 200-2 of the smartphone 100-1 guiding the user during the enrollment process of the biometric data by utilizing the collocation of the user's touch (e.g., 202, 202-1, 202-2, 202-3, 202-4) and the fingerprint sensor 112 (e.g., UDFPS 112-1, UDFPS active area 206). FIG. 2-2 is described in the context of FIGS. 1 and 2-1, the computing device 100 (e.g., smartphone 100-1), the fingerprint identification system 108, the display screen 110, the area 204 of FIG. 2-1, and the fingerprint sensor 112 (e.g., UDFPS 112-1, UDFPS active area 206). FIG. 2-2 illustrates the area 204 and the UDFPS active area 206 being unchanged compared to FIG. 2-1, because these areas (204, 206) do not change as the user taps their thumb on the display screen 110.

FIG. 2-2 illustrates four user touches 202-1, 202-2, 202-3, and 202-4 being off-centered from the UDFPS active area 206. Based on the user touches 202-1, 202-2, 202-3, and 202-4, the smartphone 100-1 creates user-touch maps 212-1, 212-2, 212-3, and 212-4, respectively, on the display screen 110. Based on the user-touch maps 212-1, 212-2, 212-3, and 212-4, the smartphone 100-1 determines user-touch centroids 218-1, 218-2, 218-3, and 218-4, respectively. As is illustrated in FIG. 2-2, the user-touch centroids 218-1 to 218-4 are off-centered from the UDFPS active area 206. The smartphone 100-1, however, correlates the user-touch centroids 218-1 to 218-4 to the UDFPS active area 206 and can keep track of which portion of the user's thumb is presented to the UDFPS active area 206. In response, the smartphone 100-1 can collocate the user touches 202-1 to 202-4 to the UDFPS active area 206. Collocating the user touches 202-1 to 202-4 to the UDFPS active area 206 enables the smartphone 100-1 to guide the user during the enrollment process.

When the user taps their thumb similarly to the user touch 202-1, where the user-touch centroid 218-1 is to the right of the center of the UDFPS active area 206, the smartphone 100-1 may show the user the display message 210, stating, for example, "tap to the left." When the user taps their thumb similarly to the user touch 202-2, where the user-touch centroid 218-2 is to the left of the center of the UDFPS active area 206, the smartphone 100-1 may show the user the display message 210, stating "tap to the right." When the user taps their thumb similarly to the user touch 202-3, where the user-touch centroid 218-3 is upward of the center of the UDFPS active area 206, the smartphone 100-1 may show the user the display message 210, stating "tap downward." Finally, when the user taps their thumb similarly to the user touch 202-4, where the user-touch centroid 218-4 is downward of the center of the UDFPS active area 206, the smartphone 100-1 may show the user the display message 210, stating "tap upward." Thus, as is illustrated in FIG. 2-2, unlike existing solutions that may instruct the user with vague instructions from one thumb-tap to the next, the instructions of the smartphone 100-1 enable the user to complete the enrollment process with ease and with fewer thumb-taps.

Figures 2, 3:
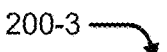
Figures 1, 3:
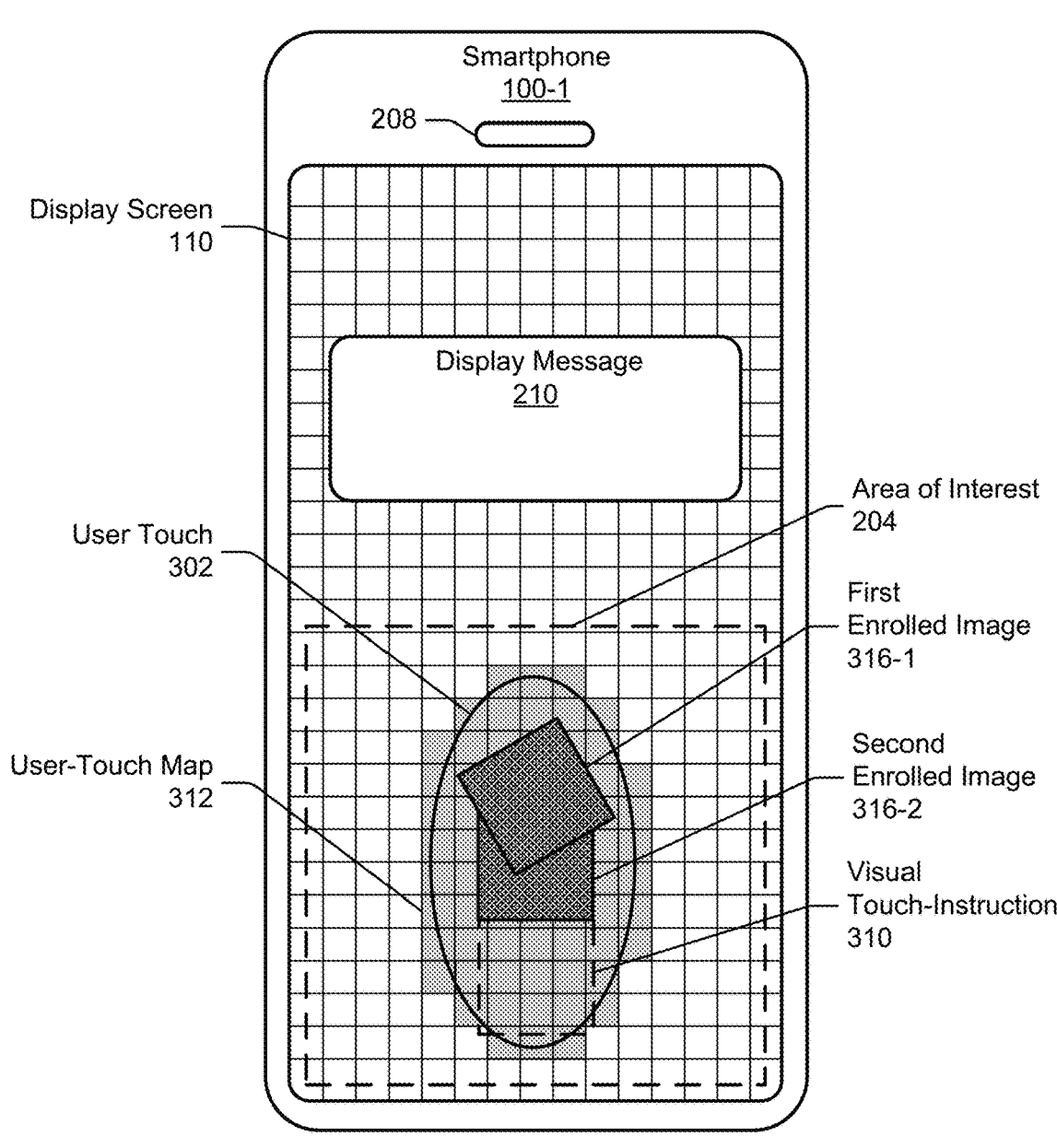
Figures 2, 3:
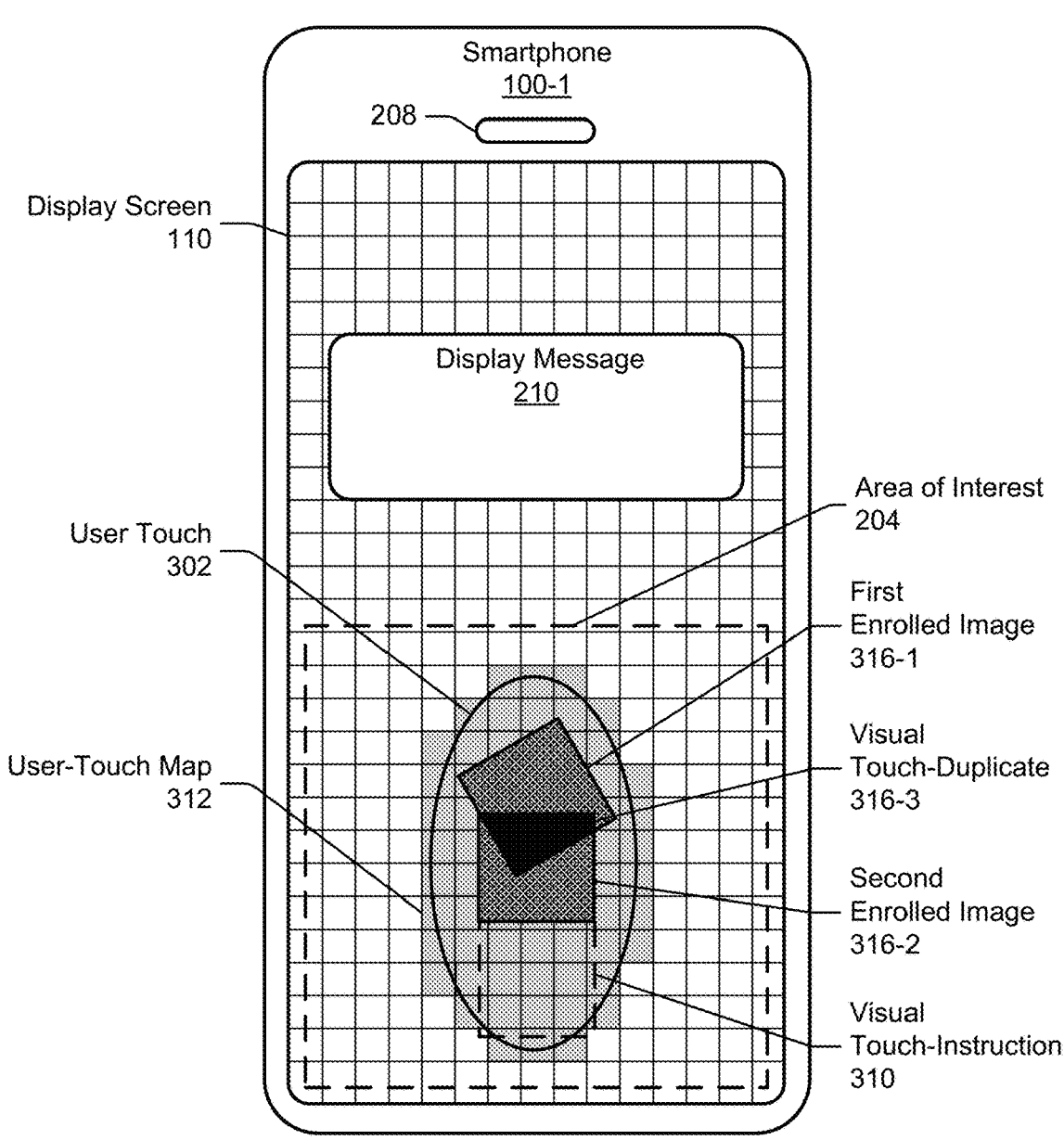

FIG. 2-3 illustrates an example environment 200-3 of the smartphone 100-1 utilizing a user-touch heatmap 212-5 on the display screen 110 during the enrollment process. FIG. 2-3 is described in the context of FIGS. 1 to 2-2, the computing device 100 (e.g., smartphone 100-1), the fingerprint identification system 108, the display screen 110, the area 204, and the fingerprint sensor 112 (e.g., UDFPS 112-1, UDFPS active area 206). FIG. 2-3 illustrates the area 204 and the UDFPS active area 206 being unchanged compared to FIGS. 2-1 and 2-2, because these areas (204, 206) do not change as the user taps their thumb on the display screen 110.

The smartphone 100-1 creates the user-touch heatmap 212-5 by aggregating the user's touches (e.g., 202 to 202-4) during the enrollment process. As such, the user-touch heatmap 212-5 is larger than individual user touches (e.g., 212, 212-1 to 212-4). FIG. 2-3 illustrates the user-touch heatmap 212-5 as a monochromic scale, including white pixels (e.g., 216), dark grey pixels (e.g., 214-1), and pixels with shades of grey lighter than the dark grey pixels or darker than the white pixels. Specifically, the white pixels represent the pixels without a touch signal (e.g., 216) from all the user touches (e.g., 212, 212-1 to 212-4); the dark grey pixels (e.g., 214-1) represent the pixels with a touch signal from most or all the user touches; and the lighter grey pixels represent pixels with a touch signal (e.g., 214-2) from some of the user touches. The smartphone 100-1 utilizes the user-touch heatmap 212-5 to guide the user to complete a whole fingerprint enrollment process with fewer thumb-taps. As a result, the smartphone 100-1 provides adequate biometric security and a pleasing user-authentication experience by creating a good enrollment template 116 of the whole fingerprint with fewer thumb-taps.

FIG. 3-1 illustrates an example environment 300-1 of the smartphone 100-1 utilizing a visual touch-instruction 310 during the enrollment process. FIG. 3 is described in the context of FIGS. 1 to 2-3, the computing device 100 (e.g., smartphone 100-1), the fingerprint identification system 108, the display screen 110, the area 204, and the fingerprint sensor 112 (e.g., UDFPS 112-1, UDFPS active area 206). During the enrollment process, the smartphone 100-1 may instruct the user on how to tap their thumb using the speaker 208, the display message 210, a peripheral of the smartphone 100-1 (e.g., wireless headphones), the visual touch-instruction 310, or a combination thereof. Although the visual touch-instruction 310 is illustrated as a square with dashed line, the smartphone 100-1 may display a visual touch-instruction using any planar shape, like, a square, a rectangle, a dot, a circle, an ellipse, a rhombus, a pentagon, a hexagon, a heptagon, an octagon, a target, a cross, or a combination thereof.

Like FIGS. 2-1 to 2-3, as the user taps their thumb on the display screen 110 on top of the UDFPS active area 206 (not illustrated in FIG. 3), the smartphone 100-1 creates a user-touch map 312 of a user touch 302 by differentiating pixels with a touch signal (e.g., 214) from pixels without a touch signal (e.g., 216) on the display screen 110. For ease of description and the sake of clarity, FIG. 3 illustrates a singular user touch (e.g., 302) and an associated user-touch map (e.g., 312). It is to be understood, however, that the smartphone 100-1 creates a user-touch map for every user touch as the user taps their thumb. Assume the user taps their thumb during a first thumb-tap; the smartphone 100-1 utilizes the UDFPS active area 206 to create a first enrolled image 316-1. The smartphone 100-1 may instruct the user to tap their thumb a second time using any form of instruction described above. Then, the smartphone 100-1 utilizes the UDFPS active area 206 to create a second enrolled image 316-2. After capturing the first enrolled image 316-1 and the second enrolled image 316-2, the smartphone 100-1 uses a fingerprint-stitching algorithm to "stitch" the first enrolled image 316-1 and the second enrolled image 316-2 to create a "stitched enrolled image" of a full fingerprint in the context of the user touch 302.

The fingerprint-stitching algorithm may divide each enrolled image (e.g., 316-1, 316-2) into an "M" number of blocks with a sliding distance of one (1) pixel, where each block is "N×N" pixels, and where "N" is an integer greater than (1). The fingerprint-stitching algorithm then extracts vectors from each block by including the following:

Rotationally invariant Absolute-value Fast Fourier Transforms (AFFTs) of each block;

The blocks' x-position and y-position, or the blocks' Cartesian coordinates;

The blocks' polar representation of the Cartesian coordinates; and

The blocks' Fast Fourier Transforms (FFTs) of the polar representation with a high resolution in a theta (θ) direction.

There is a relation between a block in Cartesian coordinates, the block's polar coordinates representation, and the block's AFFT in polar coordinates. Specifically, an angular rotation around a center point in the Cartesian coordinates transforms into translation along the theta (θ) direction in the polar coordinate representation—this is called "phase shifting." The FFT assumes periodic boundary conditions. As such, the AFFT of the "N×N" block represented in polar coordinates is rotationally invariant, and the rotation angle is the location where a maximum correlation between the FFT of two (2) blocks represented in polar coordinates occurs. The fingerprint-stitching algorithm uses rotational and translation matrices, where the rotation and translation matrix between two (2) images, herein referred to as "the first enrolled image 316-1" and "the second enrolled image 316-2," can be defined as:

$$\begin{pmatrix} \cos(\phi) & \sin(\phi) & -T_x \\ -\sin(\phi) & \cos(\phi) & -T_y \\ 0 & 0 & 1 \end{pmatrix}$$

where "φ" represents an angle between the two (2) enrolled images (e.g., 316-1, 316-2), "$T_x$" represents a translation along an x-axis between the two (2) enrolled images, and "$T_y$" represents a translation along a y-axis between the two (2) enrolled images.

The x-coordinates and the y-coordinates of the second enrolled image 316-2 can be transformed into the coordinate system of the first enrolled image 316-1 using Equation 1.

$$\begin{pmatrix} x' \\ y' \\ 1 \end{pmatrix} = \begin{pmatrix} \cos(\phi) & \sin(\phi) & -T_x \\ -\sin(\phi) & \cos(\phi) & -T_y \\ 0 & 0 & 1 \end{pmatrix}\begin{pmatrix} x \\ y \\ 1 \end{pmatrix} \qquad \text{Equation 1}$$

Furthermore, a rotational matrix between the first enrolled image 316-1 and the second enrolled image 316-2, herein labeled "$RM_{12}$," is the inverse of a rotational matrix between the second enrolled image 316-2 and the first enrolled image 316-1, herein labeled "$RM_{21}$," as is illustrated in Equation 2.

$$RM_{12}=(RM_{21})^{-1} \qquad \text{Equation 2}$$

Considering another property of the rotational matrix, "$RM_{12}$" can be determined from a rotation of a third enrolled image (not illustrated in FIG. 3), by using the first enrolled image 316-1 and the second enrolled image 316-2," as is illustrated in Equation 3.

$$RM_{12}=RM_{32}*RM_{13} \qquad \text{Equation 3}$$

where "$RM_{12}$" represents the rotational matrix between the first enrolled image 316-1 and the second enrolled image 316-2, "$RM_{32}$" represents a rotational matrix between the third enrolled image and the second enrolled image 316-2, "$RM_{13}$" represents a rotational matrix between the first enrolled image 316-1 and the third enrolled image, and * denotes the mathematical operation of a convolution between "$RM_{32}$" and "$RM_{13}$."

Then, the rotational matrices can be used to "stitch" the enrolled images (e.g., 316-1, 316-2). As is illustrated in FIG. 3, the smartphone 100-1 generates a "stitched enrolled image" of the first enrolled image 316-1 and the second enrolled image 316-2 by performing the following computations:

Calculating the rotational matrices $RM_{12}$ and $RM_{21}$;

Forming the x-vectors, y-vectors, and z-vectors of the first enrolled image 316-1 and the second image enrolled image 316-2;

Transforming the x-coordinates, the y-coordinates, and the z-coordinates of the second enrolled image 316-2 into the coordinates of the first enrolled image 316-1;

Concatenating the x-vectors, the y-vectors, and the z-vectors of the first enrolled image 316-1 and the transformed second enrolled image 316-2;

Defining a new mesh grid, which is limited by a maximum and the minimum of the first enrolled image 316-1 and the transformed second enrolled image 316-2;

Interpolating the z-vector on the new mesh grid; and

Generating the stitched enrolled image, as is illustrated in FIG. 3.

As the user taps their thumb on top of the UDFPS active area 206, the smartphone 100-1 may display the stitched enrolled image in relation to the user touch (e.g., 302). Additionally, the smartphone 100-1 may display the visual touch-instruction 310 to guide the user before a next thumb-tap during the enrollment process. Thus, the user can visualize what portion of their thumb is successfully enrolled and what portion of their thumb needs to be enrolled, enabling them to complete the fingerprint's enrollment process with ease and fewer thumb-taps.

FIG. 3-2 illustrates an example environment 300-2 of the smartphone 100-1 utilizing a visual touch-duplicate 316-3 (illustrated as a solid black area) and the visual touch-instruction (e.g., 310) during the enrollment process. A visual touch-duplicate may be an image of a portion of a thumb, finger or palm that is common to two or more enrolled images. Like FIG. 3-1, as the user taps their thumb on the display screen 110 on top of the UDFPS active area 206 (not illustrated in FIG. 3), the smartphone 100-1 of FIG. 3 creates the user-touch map 312 of the user touch 302 by differentiating pixels with a touch signal (e.g., 214) from pixels without a touch signal (e.g., 216) of the display screen 110. The smartphone 100-1 utilizes the first enrolled image 316-1 and the second enrolled image 316-2 to create the stitched enrolled image. The smartphone 100-1 may display the visual touch-duplicate 316-3 to better guide the user to use fewer thumb-taps during the enrollment process. Note that there is a positive relation between duplicate touches and the count of thumb-taps during the enrollment process. Also, as in FIG. 3-1, the smartphone 100-1 may instruct the user on how to tap their thumb using the speaker 208, the display message 210, a peripheral of the smartphone 100-1 (e.g., wireless headphones), the visual touch-instruction 310, or a combination thereof.

Figure 4:
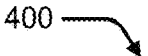
FIG. 4 illustrates an example environment of the smartphone having an active area of the at least one fingerprint sensor, the active area of the least one fingerprint sensor being larger than the user's touch.

FIG. 4 illustrates an example environment 400 of the smartphone 100-1 having a UDFPS active area 406 that is larger than a user's touch 402. Like FIGS. 2-1 to 3-2, the smartphone 100-1 creates a user-touch map 412 of the user touch 402 by differentiating pixels with a touch signal (e.g., 414) from pixels without a touch signal (e.g., 416) of the display screen 110. Based on the user-touch map 412, the smartphone 100-1 determines a user-touch centroid 418. The smartphone 100-1 then can correlate the user-touch centroid 418 to the UDFPS active area 406. In response, the smartphone 100-1 can collocate the user touch 402 to the fingerprint sensor 112 (e.g., UDFPS active area 406).

The smartphone 100-1 may also instruct the user to press and hold their thumb using the speaker 208, the display message 210, a peripheral of the smartphone 100-1 (e.g., wireless headphones), or a combination thereof. The smartphone 100-1 may divide the user-touch map 412 into "M" number of blocks with a sliding distance of one (1) pixel. Each of the "M" number of blocks may be "N×N" pixels (e.g., N×N block 420) and/or "NxP" pixels, where "N" and "P" are different integers and are greater than one (1). For simplicity, FIG. 4 illustrates six (6) equal blocks with "N×N" pixels, where M=6. Nevertheless, "M" can be any integer greater than one (1) and the blocks may be of a different size (e.g., "N×N" pixels and/or "NxP" pixels). Given that the UDFPS active area 406 is larger than the user's touch 402, the smartphone 100-1 may complete the enrollment process after a single user touch (e.g., 402) by capturing and enrolling each of the "M" number of blocks.

Figure 5:
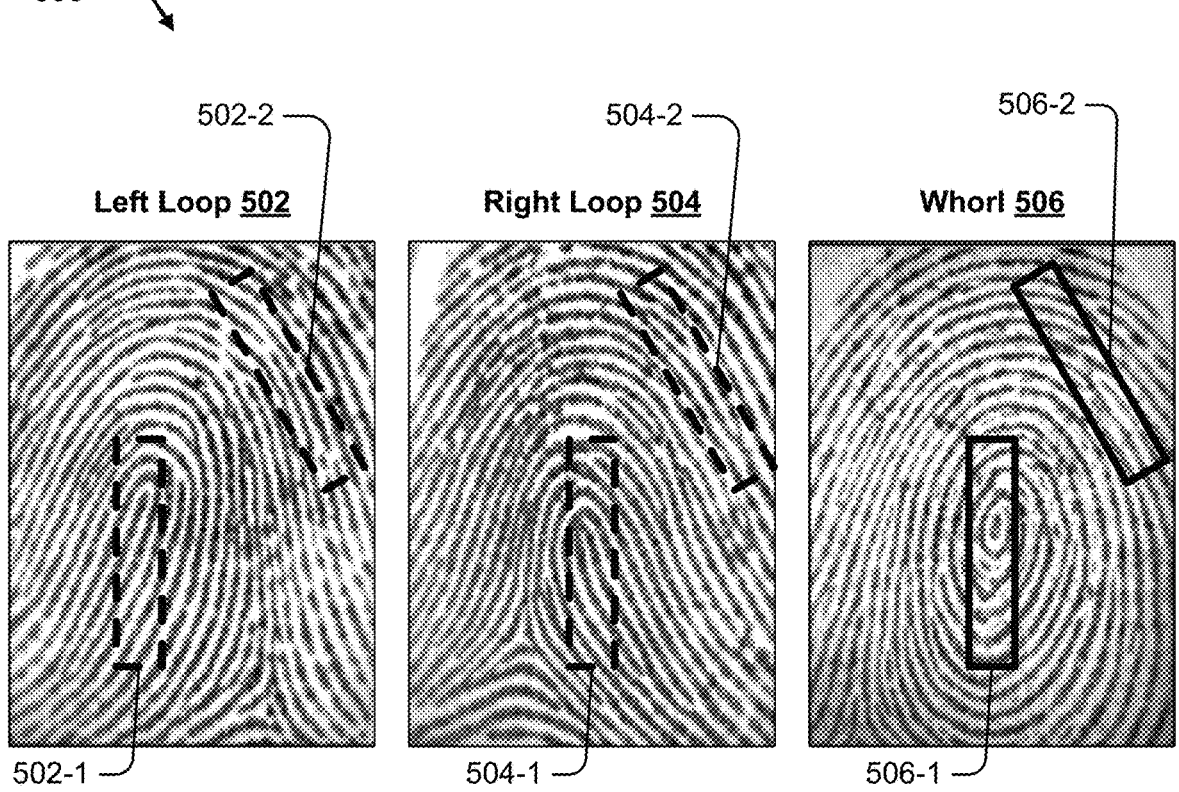
FIG. 5 illustrates an example environment of the smartphone using patterns of fingerprint ridges to determine the collocation of the user's touch and the at least one fingerprint sensor.
Figure 5:
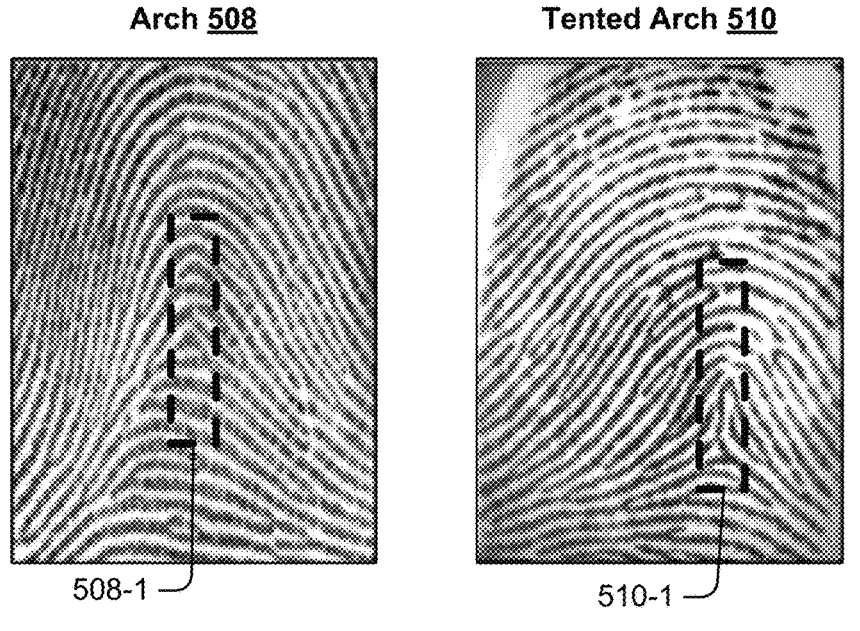

FIG. 5 illustrates an example environment 500 of the smartphone 100-1 using patterns of fingerprint ridges to determine the collocation of the user's touch and the at least one fingerprint sensor 112. Fingerprint ridges can be classified based on five (5) major patterns: a left loop 502, a right loop 504, a whorl 506, an arch 508, and a tented arch 510. The left loop 502 is a fingerprint ridge that enters from a finger's left side, forms a curve, and then exits from the left side of the finger. Similarly, the right loop 504 is a fingerprint ridge that enters from a right side of a finger, forms a curve, and then exits on the finger's right side. The whorl 506 is a fingerprint ridge that is circular around a central point. The arch 508 is a fingerprint ridge that enters from one side of a finger, rises in the center, forming an arc, and then exits the other side of the finger. The tented arch 510 fingerprint ridge is similar to the arch 508 fingerprint ridge, where at least one ridge of the fingerprint has a high curvature, forming a tent-like shape. It is to be understood that fingerprint ridges also contain minutiae, as is illustrated in FIG. 6, and the smartphone 100-1 may also use the minutiae in some respects during the enrollment process.

Assume the fingerprint sensor 112 is a side fingerprint sensor 112-2 (not illustrated). The smartphone 100-1 instructs the user to use the side fingerprint sensor 112-2 to tap their thumb during the enrollment process. When using the side fingerprint sensor 112-2 during the enrollment process, the smartphone 100-1 cannot utilize the display screen 110 to create a user-touch map or a user-touch heatmap. Without the user-touch map or the user-touch heatmap, the smartphone 100-1 cannot determine a centroid of the user's touch. To this end, the smartphone 100-1 determines whether the user's thumb includes a left loop 502, a right loop 504, a whorl 506, an arch 508, or a tented arch 510. In lieu of a centroid of the left loop 502, the right loop 504, the whorl 506, the arch 508, or the tented arch 510, the smartphone 100-1 uses distinguishing features 502-1, 504-1, 506-1, 508-1, and 510-1, respectively. As is illustrated in FIG. 5, the left loop 502, the right loop 504, the whorl 506, the arch 508, or the tented arch 510 are arranged around the distinguishing features 502-1, 504-1, 506-1, 508-1, and 510-1, respectively. Without determining the centroid of the user's touch, the smartphone 100-1 may use the distinguishing features 502-1, 504-1, 506-1, 508-1, and 510-1 to guide the user during the enrollment process.

For example, assume the user's thumb includes the whorl 506. As the user initially enrolls a portion 506-2 of their fingerprint, the smartphone 100-1 may be unable to determine whether the user's thumb includes a whorl 506-2, a right loop 504-2, or a left loop 502-2 because the portions 502-2, 504-2, and 506-2 may appear to be part of either the left loop 502, the right loop 504, or the whorl 506. In FIG. 5, note that the portions 502-2, 504-2, and 506-2 have similar orientations of fingerprint ridges. As the user, however, enrolls a different portion of their thumb after a second thumb-tap, the smartphone 100-1 can determine with more confidence whether the user's thumb includes the whorl 506. Further, the smartphone 100-1 may utilize a machine-learned model to determine the pattern of the user's fingerprint. The machine-learned model may be a support vector machine, a recurrent neural network, a convolutional neural network, a deconvolution neural network, a dense neural network, a generative adversarial network, heuristics, or a combination thereof. Inputs to the machine-learned model are the user's enrolled fingerprint images captured by the fingerprint sensor 112 (e.g., the side fingerprint sensor 112-2). Outputs of the machine-learned model are classifications of the fingerprint ridges as a left loop 502, a right loop 504, a whorl 506, an arch 508, or a tented arch 510. Given the sizeable computational power that machine learning can use to train a model, the model training can be performed on a cloud, server, or other capable computing device or system. Periodic model updates can be sent to the computing device 100 (e.g., smartphone 100-1), allowing the computing device 100 to execute the machine-learned model even if the computing device 100 does not have the resources to update the model itself.

Figure 6:
FIG. 6 illustrates examples of minutiae of the fingerprint ridges that may be used during the enrollment process of the biometric data.

FIG. 6 illustrates examples of minutiae 610 to 630 that may be used during the enrollment process. The minutiae 610 through 630 are small (smaller than the patterns) features of fingerprint ridges. Examples of minutiae are a ridge ending 610, a bifurcation 612, a short ridge 614, a dot 616, a bridge 618, a break 620, a spur 622, an island 624, a double bifurcation 626, a delta 628, a trifurcation 630, a lake or a ridge enclosure (not illustrated), a core (not illustrated), and so forth. The computing device 100 uses the minutiae (e.g., 610 to 630) in addition to the patterns of FIG. 5, enabling the computing device 100 to further refine and determine the distinguishing features (e.g., 502-1, 504-1, 506-1, 508-1, and 510-1) of the patterns (e.g., 502, 504, 506, 506, 508, and 510).

Example Methods

FIG. 7 illustrates a computer-implemented method 700 that enables the user to complete the biometric data enrollment process. The computer-implemented method 700 is organized in stages 702 through 710 and utilizes apparatuses, methods, and techniques described in FIGS. 1 to 6. The stages 702 through 710 may be executed in a different order or at various times, depending on the exact implementation of the biometric data's (e.g., patterns, minutiae) enrollment process.

At stage 702, the computing device 100 (e.g., smartphone 100-1) creates a user-touch map (e.g., 212) of a user's touch (e.g., 202) on a display screen (e.g., 110) of a computing device 100 (e.g., smartphone 100-1). The user's touch enables sensing of biometric data (e.g., fingerprint) of the user's skin (e.g., thumb, finger, palm). The smartphone 100-1 may create the user-touch map by differentiating pixels with a touch signal (e.g., 214) from pixels without a touch signal (e.g., 216) on the display screen (e.g., 110).

At stage 704, the computing device 100 determines an approximate centroid of the user's touch (e.g., 218). The approximate centroid of the user's touch is an arithmetic mean location of the user's touch. For example, after the smartphone 100-1 creates the user-touch map, the smartphone may use an algorithm to determine the approximate centroid of the user-touch map. Alternatively or additionally to the approximate centroid of user's touch, the smartphone 100-1 may use distinguishing features (e.g., 502-1, 504-1, 506-1, 508-1, and 510-1) of patterns (e.g., left loop 502, right loop 504, whorl 506, arch 508, and tented arch 510) of fingerprint ridges.

At stage 706, the computing device 100 correlates the approximate centroid of the user's touch to a location of a fingerprint sensor 112 (e.g., UDFPS 112-1, side fingerprint sensor 112-2) of the computing device 100. It is to be understood that the fingerprint sensor 112 is stationary with respect to the computing device 100. Thus, at stage 708, the computing device 100 collocates the user's touch (e.g., 218) to the location of the fingerprint sensor 112, enabling the computing device 100 to keep track of a portion of the fingerprint in relation to the full fingerprint.

Consequently, at stage 710, the computing device 100 can guide the user during the fingerprint enrollment process. For example, the computing device 100 may instruct the user on how to tap their thumb using the speaker 208, the display message 210, a peripheral of the computing device 100 (e.g., wireless headphones), the visual touch-instruction 310, or a combination thereof. The instructions of the computing device 100 may include messages, such as "tap to the right," "tap to the left," "tap upward," "tap downward," and so forth. The computing device 100 enables the user to complete the enrollment process with ease and with fewer thumb-taps. Consequently, the computer-implemented method 700 enables biometric security with an enrollment process having a good user experience.

The following are additional examples of the describes apparatuses, methods, and techniques that enable the user to complete the enrollment process of the biometric data.

Example 1: A computer-implemented method (700) comprising: creating a user-touch map (212) of a user's touch (202) on a display screen (110) of a computing device (100), the user's touch (202) enabling sensing of biometric data (502, 610) of the user's skin; determining an approximate centroid (218) of the user's touch (202), the approximate centroid (218) comprising an arithmetic mean location of the user's touch (202); correlating the centroid (218) of the user's touch (202) to a location of at least one fingerprint sensor (112) of the computing device (100); responsive to the correlating, collocating the user's touch (202) to the location of the at least one fingerprint sensor (112); and responsive to the collocating, guiding the user during an enrollment process of the biometric data (502, 610).

Example 2: The computer-implemented method of Example 1, wherein: the biometric data comprising fingerprint data of the user's skin, the fingerprint data derived from a same fingertip, thumb, or palm; and the fingerprint data comprising: at least one pattern, wherein the at least one pattern is a left loop, a right loop, a whorl, an arch, or a tented arch; and at least one minutia, wherein the at least one minutia is a ridge ending, a bifurcation, a short ridge, a dot, a bridge, a break, a spur, an island, a double bifurcation, a delta, a trifurcation, a lake, a ridge, or a core.

Example 3: The computer-implemented method of Example 1 or 2, wherein: the fingerprint sensor is an optical under-display fingerprint sensor, UDFPS; and the UDFPS is embedded under the display screen.

Example 4: The computer-implemented method of any of the preceding Examples, wherein: the user's touch is larger than an active area of the UDFPS, the active area of the UDFPS capturing enrolled images of the biometric data, the enrolled images including: a first enrolled image captured after a first touch; and a second enrolled image captured after a second touch.

Example 5: The computer-implemented method of any of the preceding Examples, wherein the guiding includes instructing the user on tapping their thumb, finger, or palm on top of the UDFPS by displaying a display message on the display screen.

Example 6: The computer-implemented method of any of the preceding Examples, wherein the guiding includes instructing the user on tapping their thumb, finger, or palm on top of the UDFPS by displaying a visual element on the display screen, the visual element comprising a square, a rectangle, a circle, an ellipse, a rhombus, a pentagon, a hexagon, a heptagon, an octagon, a target, a cross, or a combination thereof.

Example 7: The computer-implemented method of any of the preceding Examples, wherein the guiding includes displaying on the display screen: a first enrolled image; a second enrolled image; and a stitching of the first enrolled image and the second enrolled image.

Example 8: The computer-implemented method of any of the preceding Examples, wherein the guiding includes displaying on the display screen a visual touch-duplicate, the visual touch-duplicate representing a same biometric data between a first enrolled image and a second enrolled image.

Example 9: The computer-implemented method of any of the preceding Examples, wherein the guiding includes instructing the user on tapping their thumb, finger, or palm on top of the UDFPS by transmitting an acoustic message using a speaker of the computing device or a peripheral thereof.

Example 10: The computer-implemented method of Examples 1 to 3, wherein an active area of the UDFPS is larger than the user's touch and, responsive to the active area of the UDFPS being larger than the user's touch, completing the enrollment process of the biometric data after a single user touch, the completing by dividing the user-touch map into at least two blocks, each of the at least two blocks having a sliding distance of one pixel and including at least four pixels.

Example 11: The computer-implemented method of any of the preceding Examples, wherein the collocating uses a distinguishing feature of an at least one pattern, and the at least one pattern is arranged around the distinguishing feature.

Example 12: A computing device (100) comprising: at least one fingerprint sensor (112); at least one display screen (110); at least one processor (104); and at least one computer-readable medium (106) having instructions thereon that, responsive to execution by the at least one processor, are configured to: create a user-touch map (212) of a user's touch (202) on the at least one display screen (110), the user's touch (202) enabling sensing of biometric data (502, 610) of the user's skin; and determine an approximate centroid (218) of the user's touch (202), wherein the approximate centroid (218) comprises an arithmetic mean location of the user's touch (202).

Example 13: The computing device of Example 12, wherein the instructions are further configured to: correlate the centroid (218) of the user's touch (202) to the location of the at least one fingerprint sensor (112); collocate the user's touch (202) to the location of the at least one fingerprint sensor (112) in response to correlation of the centroid (218) of the user's touch (202) to the location of the at least one fingerprint sensor (112); and guide the user, during an enrollment process, in response to the collocation of the user's touch (202) to the location of the at least one fingerprint sensor (112).

Example 14: The computing device of Examples 12 or 13, wherein: the at least one fingerprint sensor is an optical under-display fingerprint sensor, UDFPS; the UDFPS is embedded under the at least one display screen; and the UDFPS comprises an active area configured to capture enrolled images of the biometric data, the enrolled images including: a first enrolled image captured after a first touch; and a second enrolled image captured after a second touch.

Example 15: The computing device of Examples 12, 13, or 14, wherein the instructions are further configured to guide the user during the enrollment process by displaying on the display screen: a display message; a visual element, the visual element comprising a square, a rectangle, a circle, an ellipse, a rhombus, a pentagon, a hexagon, a heptagon, an octagon, a target, a cross, or a combination thereof; the first enrolled image; the second enrolled image; a stitching of the first enrolled image and the second enrolled image; or a visual touch-duplicate, the visual touch-duplicate representing a same biometric data between the first enrolled image and the second enrolled image.

Example 16: A computer-readable medium comprising instructions that, when executed by a processor of a computing device, cause the processing device to perform the method of any of Examples 1 to 11.

Conclusion

While various aspects of the disclosure are described in the foregoing description and illustrated in the drawings, it is to be understood that this disclosure is not limited thereto but may be variously embodied to practice within the scope of the following claims. From the foregoing description, it will be apparent that various changes may be made without departing from the disclosure's spirit and scope as defined by the following claims.

What is claimed:

1. A computer-implemented method comprising:
creating a user-touch map of a user input at a display screen of a computing device, the user input sufficient to enable sensing of biometric data associated with a user;
determining an approximate centroid of the user input;
determining a distinguishing feature of at least one pattern associated with the user input;
correlating the centroid of the user input and the distinguishing feature of the at least one pattern associated with the user input to a location of at least one fingerprint sensor of the computing device;
responsive to the correlating, collocating the user input to the location of the at least one fingerprint sensor; and
responsive to the collocating, guiding a user during an enrollment process of the biometric data.

2. The computer-implemented method of claim 1, wherein:
the biometric data comprising fingerprint data of skin of the user, the fingerprint data derived from a same fingertip, thumb, or palm; and
the fingerprint data comprising:
the at least one pattern, wherein the at least one pattern is a left loop, a right loop, a whorl, an arch, or a tented arch; and
at least one minutia, wherein the at least one minutia is a ridge ending, a bifurcation, a short ridge, a dot, a bridge, a break, a spur, an island, a double bifurcation, a delta, a trifurcation, a lake, a ridge, or a core.

3. The computer-implemented method of claim 1, wherein:
the fingerprint sensor is an optical under-display fingerprint sensor (UDFPS); and
the optical UDFPS is embedded under the display screen.

4. The computer-implemented method of claim 3, wherein:
the user input is larger than an active area of the optical UDFPS, the active area of the optical UDFPS capturing enrolled images of the biometric data, the enrolled images including:
a first enrolled image captured after a first touch; and
a second enrolled image captured after a second touch.

5. The computer-implemented method of claim 3, wherein the guiding includes instructing the user on tapping their thumb, finger, or palm on top of the optical UDFPS by displaying a display message on the display screen.

6. The computer-implemented method of claim 3, wherein the guiding includes instructing the user on tapping their thumb, finger, or palm on top of the optical UDFPS by displaying a visual element on the display screen, the visual element comprising a square, a rectangle, a circle, an ellipse, a rhombus, a pentagon, a hexagon, a heptagon, an octagon, a target, a cross, or a combination thereof.

7. The computer-implemented method of claim 3, wherein the guiding includes instructing the user on tapping their thumb, finger, or palm on top of the optical UDFPS by transmitting an acoustic message using a speaker of the computing device or a peripheral thereof.

8. The computer-implemented method of claim 3, wherein an active area of the optical UDFPS is larger than the user input and, responsive to the active area of the optical UDFPS being larger than the user input, completing the enrollment process of the biometric data after a single user touch, the completing by dividing the user-touch map into at least two blocks, each of the at least two blocks having a sliding distance of one pixel and including at least four pixels.

9. The computer-implemented method of claim 1, wherein the guiding includes displaying on the display screen:
   a first enrolled image;
   a second enrolled image; and
   a stitching of the first enrolled image and the second enrolled image.

10. The computer-implemented method of claim 1, wherein the guiding includes displaying on the display screen a visual touch-duplicate, the visual touch-duplicate representing a same biometric data between a first enrolled image and a second enrolled image.

11. The computer-implemented method of claim 1, wherein the at least one pattern is arranged around the distinguishing feature.

12. A computing device comprising:
   at least one fingerprint sensor;
   at least one display screen;
   at least one processor; and
   at least one computer-readable medium having instructions thereon that, responsive to execution by the at least one processor, are configured to:
      create a user-touch map of a user input at the at least one display screen, the user input sufficient to enable sensing of biometric data associated with the user;
      determine an approximate centroid of the user input;
      determine a distinguishing feature of at least one pattern associated with the user input;
      correlate the centroid of the user input and the distinguishing feature of the at least one pattern associated with the user input to a location of at least one fingerprint sensor of the computing device;
      responsive to the correlation, collocate the user input to the location of the at least one fingerprint sensor; and
      responsive to the collocation, direct a user during an enrollment process of the biometric data.

13. The computing device of claim 12, wherein the instructions are further configured to direct the user during the enrollment process by a presentation on the display screen of:
   a first enrolled image;
   a second enrolled image;
   a stitching of the first enrolled image and the second enrolled image; or a visual touch-duplicate, the visual touch-duplicate representing a same biometric data between the first enrolled image and the second enrolled image.

14. The computing device of claim 12, wherein:
   the biometric data comprises fingerprint data of skin of the user the, the fingerprint data derived from a same fingertip, thumb, or palm; and
   the fingerprint data comprises:
      the at least one pattern, wherein the at least one pattern is a left loop, a right loop, a whorl, an arch, or a tented arch; and
      at least one minutia, wherein the at least one minutia is a ridge ending, a bifurcation, a short ridge, a dot, a bridge, a break, a spur, an island, a double bifurcation, a delta, a trifurcation, a lake, a ridge, or a core.

15. The computing device of claim 12, wherein the at least one pattern is arranged around the distinguishing feature.

16. The computing device of claim 12, wherein:
   the at least one fingerprint sensor is an optical under-display fingerprint sensor (UDFPS); and
   the optical UDFPS is embedded under the at least one display screen.

17. The computing device of claim 16, wherein:
   the user input is larger than an active area of the optical UDFPS, the active area of the optical UDFPS capturing enrolled images of the biometric data, the enrolled images including:
   a first enrolled image captured after a first touch; and
   a second enrolled image captured after a second touch.

18. The computing device of claim 16, wherein the direction of the user includes a presentation of an instruction on the display screen to direct the user to tap their thumb, finger, or palm on top of the optical UDFPS.

19. The computing device of claim 16, wherein the direction of the user includes a presentation of a visual element on the display screen to direct the user to tap their thumb, finger, or palm on top of the optical UDFPS, the visual element comprising a square, a rectangle, a circle, an ellipse, a rhombus, a pentagon, a hexagon, a heptagon, an octagon, a target, a cross, or a combination thereof.

20. The computing device of claim 12, wherein the direction of the user includes a presentation on the display screen a visual touch-duplicate, the visual touch-duplicate representing similar biometric data between a first enrolled image and a second enrolled image.

* * * * *